United States Patent [19]

Hyde et al.

[11] 4,106,782
[45] Aug. 15, 1978

[54] CERAMIC COATED PISTON RINGS

[75] Inventors: Glenn F. Hyde, Timonium; Thomas W. Alban, Glen Burnie, both of Md.

[73] Assignee: Koppers Company, Inc., Pittsburgh, Pa.

[21] Appl. No.: 825,753

[22] Filed: Aug. 18, 1977

[51] Int. Cl.$^2$ .................................................. F16J 9/12
[52] U.S. Cl. ................................ 277/235 A; 277/224; 427/34; 427/423
[58] Field of Search ............... 277/96 A, 216, 223, 277/224, 235 R, 235 A, 236; 29/156.6; 427/34, 423

[56] References Cited

U.S. PATENT DOCUMENTS

| 3,113,885 | 12/1963 | Teague | 427/423 X |
| 3,269,856 | 8/1966 | Jones | 427/34 X |
| 3,310,423 | 3/1967 | Ingham | 427/423 X |
| 3,481,715 | 12/1969 | Whalen et al. | 277/235 A X |
| 3,607,343 | 9/1971 | Longo et al. | 427/423 X |
| 3,697,091 | 10/1972 | Prasse et al. | 277/235 A |
| 3,927,223 | 12/1975 | Takabatake et al. | 427/34 |
| 3,941,903 | 3/1976 | Tucker | 427/423 X |

FOREIGN PATENT DOCUMENTS

| 2,227,140 | 11/1974 | France | 427/34 |
| 2,129,679 | 1/1972 | Fed. Rep. of Germany | 427/423 |
| 1,003,118 | 9/1965 | United Kingdom | 427/34 |
| 323,394 | 7/1972 | U.S.S.R. | 427/34 |

Primary Examiner—Robert S. Ward, Jr.
Attorney, Agent, or Firm—Thomas L. Sivak; Oscar B. Brumback

[57] ABSTRACT

Disclosed herein is a piston ring for an internal combustion ring having its face plasma sprayed with a ceramic coating comprised of 40% by weight titanium dioxide and 60% by weight aluminum oxide. The ceramic coating material has a low coefficient of friction, high material integrity and superior wetting characteristics.

6 Claims, 3 Drawing Figures

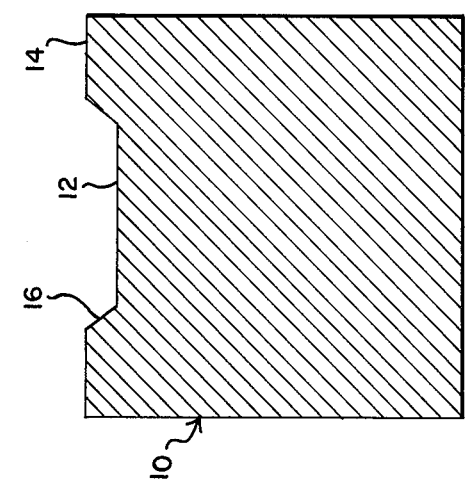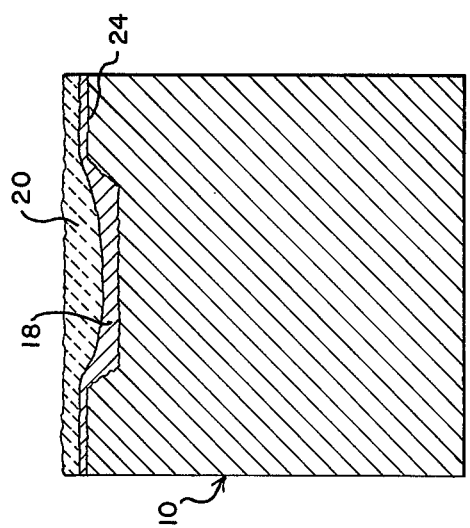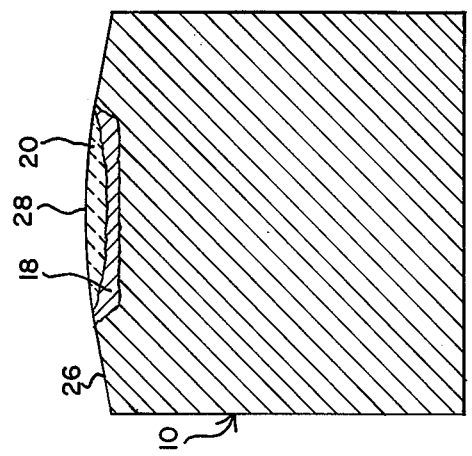

CERAMIC COATED PISTON RINGS

BACKGROUND OF THE INVENTION

1. Field of Invention:

This invention relates to piston rings and more particularly to piston rings for use in internal combustion engines which have their bearing face plasma sprayed with nickel aluminide and a ceramic wear and scuff resistant coating comprised of aluminum oxide and titanium dioxide.

2. Description of the Prior Art

Since internal combustion engines such as diesel engines having higher power and speeds are coming into service, piston ring bearing faces have been coated with various materials to improve their wear characteristics. Chromium has been used as a coating material for many years. However, chromium is relatively expensive especially when compared to the scuff and wear resistance it provides.

U.S. Pat. No. 3,697,091 discloses a coating comprised essentially of a mixture of aluminum oxide and titanium dioxide in specified percentages by weight. Although the coating disclosed in U.S. Pat. No. 3,697,091 did exhibit a certain degree of good wear and scuff resistance in tests, it is believed that these compositions do not exhibit the superior qualities demonstrated by the compositions of the present application. Further, it does not appear that the compositions of U.S. Pat. No. 3,697,091 have found commercial acceptance.

Copending application Ser. No. 759,841 filed Jan. 17, 1977, discloses and claims a ceramic coating comprised of aluminum oxide and relatively small percentages by weight of titanium dioxide and ferric oxide. This ceramic coating demonstrates both a high degree of wear and scuff resistance.

SUMMARY OF THE INVENTION

The present invention provides a ceramic coating which demonstrates a low coefficient of friction, high material integrity and superior wetting characteristics for better scuff resistance together with high wear resistance.

The foregoing is accomplished by plasma jet spraying a bond coating to the bearing face of a piston ring formed from centrifically cast ductile iron. The iron is properly heat treated and machined to form it into a split ring having a circumferential groove cut into its bearing face. The bearing face of the ring is then grit blasted to a mat-like surface using aluminum oxide grit. The bond coating of nickel aluminide, aluminum particles coated with nickel, is then applied to the substrate surface by a plasma gun. The gun uses a nitrogen-hydrogen fuel gas. The bond coating is applied as an in situ formed coating to a thickness of 0.0005 to 0.0015 inch. The ceramic coating comprised of 35–45% by weight titanium dioxide and 55–65% by weight aluminum oxide is then applied by the plasma gun using a nitrogen-hydrogen or argon-hydrogen gas. The ceramic coating is applied to a thickness of 0.020 to 0.040 inch onto the bonding coat. The ring is then ground by a diamond bonded wheel to remove a small amount of coating and expose the shoulders of the bearing face of the ring. The coating is then lapped to its final thickness by boron-carbide abrasive which finally forms the ring and shapes the coating to a crown. The piston rings of the present invention have demonstrated a lower coefficient of friction, higher material integrity and superior wetting characteristics to those of prior art.

BRIEF DESCRIPTION OF THE DRAWINGS

FIG. 1 is an enlarged fragmentary cross-sectional view of a grooved piston ring prior to spraying.

FIG. 2 is an enlarged fragmentary cross-sectional view of a piston ring of the present invention prior to final grinding and lapping.

FIG. 3 is an enlarged fragmentary cross-sectioned view of a piston ring of the present invention showing the finished bearing face of the ring.

DESCRIPTION OF THE PREFERRED EMBODIMENT

Referring to the Figures, a typical compression ring 10 has a circumferential groove 12 which has been cut to a depth of 0.018 inch by means well known in the art while the ring was mounted on an arbor (not shown). Ring 10 is made from centrifically cast ductile iron which has been malleablized to remove hard spots such as iron carbides. The ring is also austenitized in a salt bath treatment at 1550° F. and then quenched in a second salt bath solution at 400° F. The ring is then tempered to a hardness of 40–60 on the Rockwell C Scale in an air furnace. Ring 10 also undergoes certain cutting operations whereby the final dimensions are secured and a slot is cut in the ring to form the split ring. Ring 10 has a bearing face 14 and groove faces 16. Groove faces 16 are cut at an angle of 55° from the vertical.

Prior to plasma spraying, ring 10 is thoroughly degreased and the groove face is grit blasted to a mat-like surface using 54–60 sized $Al_2O_3$ grit. The ring is then preheated by the plasma gun to 250°–300° F. The ring is now prepared for the application of the bond and ceramic coatings. It will be understood that the operation of the plasma gun is well understood by those skilled in the art and the details of its operation or construction will not be explained in detail here. It will also be understood that when the bond and ceramic coatings are applied, as when the cutting operations previously described are performed, ring 10 is only one of approximately 56 rings mounted on an arbor. During the coating operation the arbor is rotated at approximately 150 r.p.m. and the plasma gun traverses the length of the arbor.

In the preferred embodiment the bond coating of nickel aluminide is now plasma sprayed on the mat-like surface of the groove face 16 of ring 10. The nickel aluminide coating 18 is sprayed to a thickness of 0.0010 inch. Nitrogen-hydrogen are used as the plasma gas and the gun power is set at 600 amps, 75 volts and 45 kilowatts. After the nickel aluminide coating 18 is applied, the ceramic coating 20 is applied. The ceramic material 20 is a powder comprised of 40% by weight $TiO_2$ and 60% by weight $Al_2O_3$. Nitrogen and hydrogen are used as the plasma gas and the power settings for the gun are 600 amps, 75 volts, 45 kilowatts. The ceramic coating is applied to a depth of 0.025 inch. As understood in the art, the very high velocity and temperature of the plasma gas are imparted to the bond coat powder and the ceramic coating so they strike the base material of the ring in the case of the bond coat and the bond coat in the case of the ceramic coating and are effectively welded to the surface. The ceramic coating has a hardness of R 15 N of 89 to 93 and a tensile bond strength of in excess of 5000 psi.

After the ceramic coating is applied, it is ground to a flat configuration by a diamond impregnated wheel thereby exposing shoulders 24 of bearing face 14. After shoulders 24 are exposed, ring 10 is mounted on a piston, not shown, in a cylindrical lapping barrel. The operation of the lapping barrel is well understood in the art. The action of the lapping barrel causes a bevel 26 in shoulders 24 and forms a crown 28 on the ceramic coating. The ceramic coating is lapped to a thickness of about 0.006 to 0.010 inch. The finished lapping is a root mean square finish of 8 to 12 microinches. While the preferred embodiment of the invention has been described, it will be understood that it may otherwise be embodied within the scope of the following claims.

What is claimed is:

1. A piston ring having a scuff and wear resistant ceramic coating comprised of 35 to 45 percent by weight titanium dioxide and 55 to 65 percent by weight aluminum oxide, said ceramic coating being plasma sprayed on said ring.

2. The piston ring of claim 1 wherein a bond coating selected from the group consisting of nickle aluminide, nickrome, nickle chromium and iron molybdenum is first sprayed on said ring to underlay said ceramic coating.

3. The piston ring of claim 2 wherein the bearing face of said ring is grit blasted to a mat-like surface to receive said bond coating.

4. The piston ring of claim 1 wherein said ceramic coating is comprised of 40 percent by weight titanium dioxide and 60 percent by weight aluminum oxide.

5. The piston ring of claim 4 wherein the bond coating is nickel aluminide.

6. The piston ring of claim 5 wherein the bearing face of said ring is grit blasted with aluminum oxide to a mat-like surface to receive said bond coating.

* * * * *